United States Patent Office 3,264,328
Patented August 2, 1966

3,264,328
10α-STEROIDS AND PROCESS FOR THEIR MANUFACTURE
Oskar Jeger and Kurt Schaffner, Zurich, Switzerland, assignors to Ciba Corporation, New York, N.Y., a corporation of Delaware
No Drawing. Filed July 9, 1963, Ser. No. 293,888
Claims priority, application Switzerland, July 10, 1962, 8,298/62; Aug. 17, 1962, 9,845/62; Mar. 18, 1963, 3,365/63
10 Claims. (Cl. 260—397.3)

The present invention relates to $\Delta^4$- and $\Delta^5$-3-oxo-steroids having the unnatural α-configuration of the angular methyl group in 10 position; and to a new process for the manufacture thereof. Said compounds are designated herein briefly as $\Delta^4$- and $\Delta^5$-3-oxo-10α-steroids. They are obtained from certain irradiation products of $\Delta^{1,4}$-3-oxo-steroiddienes that contain the natural β-configuration of the angular methyl group on carbon atom 10.

The products of the present process are therapeutically active compounds or intermediates suitable for the manufacture thereof. Thus, in particular, the compounds of the 10α-androstane and 10α-pregnane series display valuable pharmacological properties, for example an antiandrogenic and ovulation inhibiting action respectively. Of particular value is 10α-testosterone, its esters and its derivatives substituted in position 17α by saturated or unsaturated hydrocarbon radicals, as well as the corresponding derivatives which are dehydrogenated in 1,2-position. The compounds of the 10α-pregnane series exhibit particularly also a gestagenic activity.

The few $\Delta^4$-3-oxo-10α-steroids known have hitherto been accessible only by way of complicated total syntheses. It has now been found that from the $\Delta^3$-2-oxo-1:5β-cyclo-10α-steroids (which are obtained in good yields by irradiating $\Delta^{1,4}$-3-oxo-steroid dienes, as described in Belgian Patent No. 564,254, patented July 25, 1958, to Ciba Société Anonyme (cf. e.g. "ketone B" of that patent) $\Delta^4$-3-oxo-10α-steroids can be obtained in a simple manner. According to the present process for the manufacture of these compounds the $\Delta^3$-double bond in $\Delta^3$-2-oxo-1:5β-cyclo-10α-steroids is hydrogenated, the resulting saturated ketone is treated with a strong acid in the presence or absence of an acylating agent, the possibly resulting enol acylate is oxidized with selenious acid or a derivative thereof, or hydrolyzed with an aqueous acid, $\Delta^5$-2-oxo- or 2-oxo-5α-acyloxy-10α-steroids which are possibly obtained are reacted with lead tetraacylate in the presence of glacial acetic acid and a strong acid, the resulting $\Delta^4$-2-acyloxy-3-oxo-10α-steroid is heated with zinc in a solvent, if desired the $\Delta^4$-3-oxo-10α-steroids obtained are converted into $\Delta^5$-3-oxo-10α-steroids by irradiation and/or, if desired, a possibly formed ester is hydrolyzed in known manner before or after the introduction of a $\Delta^1$-double bond, and the resulting hydroxysteroid is dehydrogenated in known manner.

The reactions of the present process are illustrated, for example, in the following scheme of partial formulae:

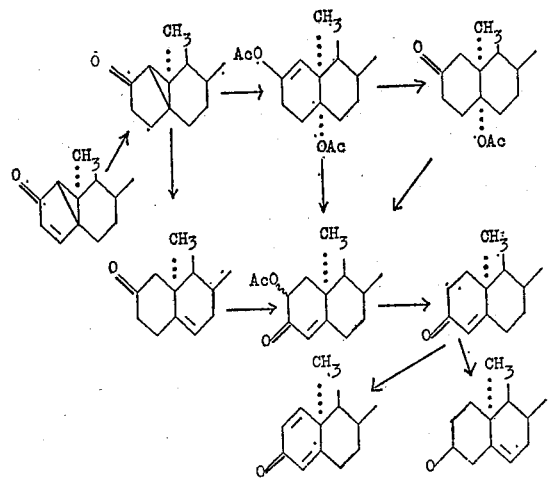

The $\Delta^3$-double bond is saturated, for example, by catalytic hydrogenation, preferably in an alcoholic, for instance ethanolic, solution and in the presence of a noble metal catalyst, for example a palladium+carbon catalyst.

The strong acids used in the present process are for example anhydrous mineral acids or sulfonic acids, such as sulfuric, hydrobromic, para-toluenesulfonic or methanesulfonic acid. Particularly suitable are also Lewis acids, such as zinc chloride, tin tetrachloride, aluminum chloride and more especially boron trifluoride in the form of its ether complex.

If the splitting of the $C_1$–$C_5$ bond is carried out in the presence of acylating agents, enol acylates, viz $\Delta^{1,2:5\alpha}$-diacyloxy-10α-steroids, are obtained, while in the absence of acylating agents, for example in solution of a lower aliphatic carboxylic acid such as formic, acetic or propionic acid, $\Delta^5$-2-oxo-10α-steroids are obtained. It is advantageous to employ as acylating agents anhydrides and halides of lower aliphatic carboxylic acids, for example of acetic, propionic, butyric, pivalic, chloracetic, trichloracetic or trifluoracetic acid. These agents are advantageously also used as solvents. The splitting is preferably carried out at temperatures ranging from −80 to 0° C.

For the oxidation of the enol acylates, selenious acid or a derivative thereof, such, for example, as selenium dioxide or an ester of selenious acid, is used in a suitable solvent that is stable towards the oxidant, for example in a lower aliphatic carboxylic acid such as acetic or propionic acid, or in a cyclic ether, more especially in dioxane. The oxidation of the invention gives $\Delta^4$-2ξ-acyloxy-3-oxo-10α-steriods directly in one step with introduction of an oxygen function in position 3 and simultaneous elimination of the 5α-acyloxy group.

The identical compounds are obtained when the 2-enol acylates obtained in the first reaction stage of the present process (acylolytic splitting of the three-membered ring) are hydrolyzed with aqueous acids and the resulting 2-oxo compounds are subjected to the action of a lead tetraacylate, for example lead tetraacetate, in a suitable solvent. The acids used are preferably mixtures of lower aliphatic carboxylic acids such as formic, acetic and propionic acid, with water in the presence of a small amount of mineral acids, for example sulfuric or perchloric acid. The reaction with lead acylates is advantageously performed in lower aliphatic carboxylic acids, for example in acetic, propionic or trifluoracetic acid, in the presence of the above-mentioned strong acids.

Treatment of the $\Delta^5$-2-oxo-10α-steroids obtained by the present process with a lead tetraacylate, such as lead tetraacetate, also gives the above-mentioned $\Delta^4$-2ξ-acyloxy-3-oxo-10α-steroids. By saponification of the last-named compounds, for instance with alkaline agents such as bicarbonates of alkali metals or with acids such as for instance diluted mineral acids, e.g. hydrochloric acid, there are obtained the corresponding free hydroxy-compounds, namely $\Delta^4$-2-hydroxy-3-oxo-10α-steroids.

The reduction with zinc, which brings about elimination of the 2-acyloxy group and leads to the final products of the present process—the $\Delta^4$-3-oxo-10α-steroids—is advantageously carried out in a solvent. Suitable for this purpose are, for example, lower aliphatic alcohols, such as methanol, ethanol, propanol, butanol or the like; also, for example, anhydrides of aliphatic carboxylic acids, such as acetic anhydride, and more especially aliphatic carboxylic acids such as acetic, propionic or other acids. The reduction according to the invention is preferably carried out at the boiling temperature of the solvent used.

By irradiating the $\Delta^4$-3-oxo-10α-steroids obtained by the present process in an inert solvent, such as lower aliphatic alcohols, for instance methanol, ethanol, propanol, butanol, especially tertiary butanol, or in an ether, such as dioxane, or in an aliphatic, cycloaliphatic or aromatic hydrocarbon, for instance in cyclohexane or benzene, with ultraviolet light, there may be obtained from the reaction mixture for instance by chromatography on neutral aluminium oxide, the corresponding isomeric $\Delta^5$-3-oxo-10α-steroids. These steroids are suitable starting compounds for the introduction of substituents in position 6 of the nucleus. For the aforementioned irradiation there are preferably used high pressure mercury arc lamps.

The $\Delta^4$-3-oxo-10α-steroids can also be dehydrogenated in 1,2-position in a manner known per se for instance with the aid of quinones, such as dicyanodichlorobenzoquinone. As solvents there are used liquids which are resistant to the action of the oxidation agent, such as for instance, hydrocarbons, for instance benzene, tertiary lower aliphatic alcohols, such as tertiary butyl alcohol, tertiary amyl alcohol or ether and, preferably, dioxane. The dehydrogenation may also be carried out in a manner known per se with the aid of selenium dioxide.

If it is desired to hydrolyze acyloxy groups in the $\Delta^4$- or $\Delta^{1,4}$-3-oxo-10α-steroids obtained, for example a 17β-acyloxy group in an androstane or a 20-acyloxy group in a pregnane, this is advantageously performed in known manner by treatment with bases, for example with alkali metal or alkaline earth metal bicarbonates, carbonates or hydroxides, for example with sodium, potassium or lithium bicarbonate, carbonate or hydroxide, or with calcium or barium carbonate or hydroxide.

The dehydrogenation of hydroxyl groups (for example of a hydroxyl group in position 17, 11 or 20) is likewise performed in known manner, preferably however by oxidation with a derivative of hexavalent chromium, for example with chromium trioxide in pyridine or in acetone+sulfuric acid, with potassium bichromate or the like. Likewise suitable are derivatives of the hypohalous acids, for example tertiary butyl hypochlorite, N-bromosuccinimide and the like. When the product obtained by the present process is a 17-oxoandrostane, for example $\Delta^4$-3:17-dioxo-10α-androstene, it is possible to introduce into it—after the $\Delta^4$-3-oxo-groupings has been selectively protected—in known manner, for example by reaction with a Grignard compound or an organo-metal compound of the type of lithium acetylide or methyl lithium, a 17α-alkyl, 17α-alkenyl or a 17α-alkinyl residue. The subsequent removal of the protective group then results in a 17-substituted $\Delta^4$-3-oxo-10α-androstene.

Statring materials suitable for use in the present process are $\Delta^3$-2-oxo-1:5β-cyclo-10α-steroids, belonging e.g. to the androstane, pregnane, cholane, cholestane, spirostane and cardanolide series, which may contain in the ring system, more especially in one or several of the positions 7, 8, 9, 11, 12, 14, 15, 16, 17, 20, 21 and in the side-chain, further substituents such as lower alkyl, for example methyl, groups, halogen atoms, free or functionally converted (that is to say esterified or etherified) hydroxyl groups and/or carbalkoxy groups. Particularly important starting materials are the representatives of the $\Delta^3$-2-oxo-1:5β-cyclo-10α-androstenes and -10α-pregnenes, for example $\Delta^3$-2-oxo-1:5β-cyclo-17β-hydroxy-10α-androstene and its esters, $\Delta^3$-2-oxo-1:5β-cyclo-17β-acyloxy-17α-alkyl-, for example 17α-methyl-, -17α-ethyl- or -17α-isobutyl-10α-androstenes, also $\Delta^3$-2-oxo-1:5β-cyclo-20-hydroxy-10α-pregnene and its esters, $\Delta^3$-2-oxo-1:5β-cyclo-11α:20-, or 11β:20-dihydroxy-10α-pregnene and its esters, and $\Delta^3$-2-oxo-1:5β-cyclo - 16α-methyl - 20-hydroxy-10α-pregnene and its esters.

The aforementioned starting materials are advantageously prepared from the corresponding $\Delta^{1,4}$-3-oxo-steroids as described in the afore-mentioned Belgian Patent No. 564,254, by irradiation with ultraviolet light followed by separation of the resulting reaction mixture of phenols and ketones. This can be achieved for instance by chromatography on aluminum oxide and elutriation with benzene. The compounds which can be used as the starting steroids in the present invention can be identified on the basis of their characteristic ultraviolet absorption spectrum which has a $\lambda_{max.}$ at about 238 m$\mu$ and an end absorption at about 207 m$\mu$ (cf. for instance ketone "B" in the aforementioned Belgian Patent No. 564,254). All the other ketonic constituents show their longest ultraviolet absorption band at wave lengths over 240 m$\mu$.

The present process yields by reaction of the aforementioned starting materials $\Delta^4$-, $\Delta^5$- or $\Delta^{1,4}$-3-oxo-10α-steroids and their esters, more especially such of the 10α-androstane and 10α-pregnane series.

Of special importance are, for example compounds of the formulae

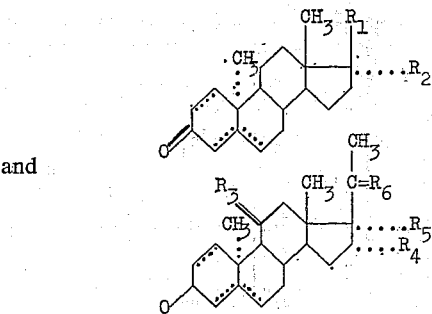

and which contain in the 4-, 5- or 1:4-position a double bond and wherein $R_1$ represents a hydroxy or acyloxy group, $R_2$ a hydrogen atom or a lower alkyl, alkenyl or alkinyl group, $R_1$ and $R_2$ together also an oxo group, $R_3$ two hydrogen atoms, an oxo group or an α- or β-positioned hydroxy group and a hydrogen atom, $R_4$ a hydrogen atom or a methyl group, $R_5$ a hydrogen atom, a hydroxy or acyloxy group and $R_6$ an oxo group or a hydroxy or acyloxy group and a hydrogen atom. Special mention deserve the following compounds:

Δ⁴-3-oxo-17β-hydroxy-10α-androstene and its esters, Δ⁴-3:17-dioxo-10α-androstene, Δ⁴-3-oxo-17α-alkyl-, 17α-alkenyl- and 17α-alkinyl-17β-hydroxy-10α-androstene and their esters, such, for example as Δ⁴-3-oxo-17α-methyl-, 17α-ethyl-, -17α-vinyl- and 17α-ethinyl-17β-hydroxy-10α-androstene and their esters; also the Δ⁴-3-oxo-20-hydroxy-10α-androstene and their esters, Δ⁴-3:20-dioxo-10α-pregnene and its substitution products, among others Δ⁴-3:11:20-trioxo-10α-pregnene, Δ⁴-3:20-dioxo-16α-methyl-10α-pregnene, Δ⁴-3:20-dioxo-17α-acyloxy-10α-pregnenes and the corresponding compounds dehydrogenated in the 1,2-position, such as 1-dehydro-10α-testosterone and 1-dehydro-10α-methyl-10α-testosterone and 1-dehydro-10α-progesterone, but also Δ⁵-3-oxo-10α- androstenes and -pregnenes, such as Δ⁵-3-oxo-17β-hydroxy-10α-androstene and its esters and Δ⁵-3,20-dioxo-10α-pregnene.

The invention further includes the 2-oxo-5α-acyloxy-10α-steroids, more especially the 2-oxo-5α-acyloxy-10α-androstanes and -pregnanes for example such of the formulae

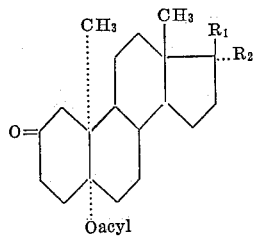

and

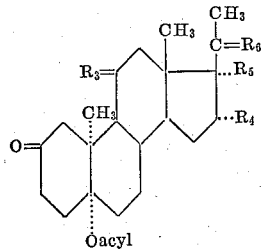

in which $R_1$ to $R_6$ have the meanings given above. There may be mentioned specifically: 2-oxo-5α-acyloxy-17β-hydroxy-10α-androstane and its esters, 2-oxo-5α:17β-diacyloxy-17α-alkyl, for example -17α-methyl- and 17α-ethyl-10α-androstanes, 2-oxo-5α-acyloxy-20-hydroxy-10α-pregnanes and their esters, and 2-oxo-5α:11α:20- and 5α:11β:20-triacyloxy-10α-pregnanes. Mention may also be made of the corresponding Δ⁵-2-oxo-10α-steroids, more especially the Δ⁵-2-oxo-10α-androstenes and -pregnenes, for example Δ⁵-2-oxo-17β-hydroxy-10α-androstene or Δ⁵-2-oxo-17β-hydroxy-17α-methyl-10α-androstene and their esters.

The invention includes also the new Δ⁴-2ξ-acyloxy-3-oxo - 10α - androstenes and -10α-pregnenes and the free hydroxy compounds obtainable therefrom, for example such of the formulae

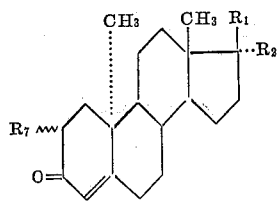

and

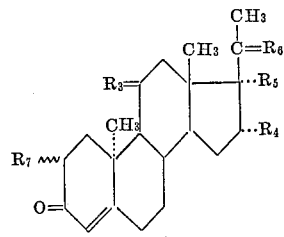

wherein $R_7$ represents a hydroxy or acyloxy group and $R_1$ to $R_6$ have the meanings given above. Specific compounds are, for example, Δ⁴-2ξ:17β-dihydroxy-3-oxo-10α-androstene and its esters, Δ⁴-2ξ:17β-dihydroxy-3-oxo-17α-methyl- and 17α-ethyl-10α-androstene and their esters, Δ⁴-2ξ:11α:20- and Δ⁴-2ξ:11β:20-trihydroxy-3-oxo-10α-pregnene and their esters.

The acid radicals in the above-mentioned esters are especially those of aliphatic, cycloaliphatic, araliphatic, heterocyclic or aromatic carboxylic acids, preferably of such as contain 1–15 carbon atoms, for example formates, acetates, propionates, butyrates, trimethylacetates, oenanthates, caproates, decanoates, cyclopentylproprionates, valerates, benzoates, furoates, hexahydrobenzoates, phenylpropionates, trifluoracetates, ethylcarbonates, methylcarbonates or the like.

The conversion of the Δ⁴- or Δ⁵-3-oxo-10α-compounds obtained as products of the present process and belonging for example to the spirostane or cholestane series, into the corresponding biologically active representatives of the androstane and pregnane series can be carried out in known manner e.g. by acylolysis and/or by oxidation.

The new pharmacologically active compounds can be used for the manufacture of pharmaceutical preparations. More particularly the preparations of the present invention are characterized by the content of one of the new Δ⁴- and Δ⁵-3-oxo-10α-steroids, especially of the androstane and pregnane series, together with a solid or liquid medicinal excipient. The preparations are made by as such known methods, for example, with the use of pharmaceutical organic or inorganic excipients, suitable for parenteral, enteral and particularly oral, or also topic administration. Suitable excipients are substances that do not react with the new compounds such, as for example, water, vegetable oils, benzyl alcohols, polyethylene glycols, gelatine, lactose, starch, magnesium stearate, talc, white petroleum jelly, cholesterol or other medicinal excipients. More especially, preparations are made which are suitable for parenteral administration, preferably solution, above all oily or aqueous solutions: furthermore suspensions, emulsions or implants; for enteral administration there are also made tablets or dragees, and for local administration also ointments or creams. If desired the preparations may be sterilized or they may contain assistants such as preserving, stabilizing, wetting or emulsifying agents, salts for regulating the osmotic pressure or buffers. They may also contain other therapeutically active compounds. They are prepared in the known manner. The content of the active substance in these preparations, such as of a tablet, is preferably 0.1–20 mg. of 0.03–50%, especially 0.1 to 10% by weight. Said pharmaceutical preparations can be used in human or veterinary medicine.

The invention is illustrated more fully in the following examples. The optical rotation is measured in each case in chloroform. The melting points are uncorrected.

*Example 1*

A mixture of 11 g. of Δ³-2-oxo-1:5β-cyclo-17β-acetoxy-10α-androstene, 200 cc. of ethanol and 2 g. of palladium carbon catalyst of 5% strength is hydrogenated. When 1 mol of hydrogen has been absorbed, the catalyst is filtered off and the filtrate is evaporated under vacuum.

On three recrystallizations of the crude product from acetone+hexane, it yields 2-oxo-1:5β-cyclo-17β-acetoxy-10α-androstane melting at 164–165° C. Optical rotation $[\alpha]_D^{25}=+37°$ (c.=0.82). Ultraviolet spectrum, $\lambda_{max.}=212$ mμ (log ε=3.78). Infrared spectrum in potassium bromide, $\lambda_{max.}=1730, 1712, 1255$ cm.$^{-1}$.

5.0 g. of Δ$^3$-2-oxo-1:5β-cyclo-20β-acetoxy-10α-pregnene (accessible by irradiation of Δ$^{1,4}$-3-oxo-20β-acetoxypregnadiene) hydrogenated in identical manner give a 90% yield of 2-oxo-1:5β-cyclo-20β-acetoxy-10α-pregnane whose spectroscopic data conform with the theoretical values.

The starting material used is the ketone B described in the afore-mentioned Belgian Patent No. 564,254, M.P. 161–162°; $[\alpha]_D=145°$ (c.=0.70), UV-spectrum $\lambda_{max.}=238$ mμ (log ε=3.34).

*Example 2*

A solution of 10 g. of 2-oxo-1:5β-cyclo-17β-acetoxy-10α-androstane in 400 cc. of acetic anhydride is cooled to −60° C. 12.5 cc. of boron trifluoride ethereate are then dropped in and the mixture is kept for 5¾ hours at −50 to −60° C. The colorless solution is then poured into ice water and extracted with ether. The crude product is filtered through neutral alumina (activity III) and gives on recrystallization from acetone+hexane 11.5 g. of Δ$^1$-2:5α:17β-triacetoxy-10α-androstene melting at 167–168° C. Optical rotation $[\alpha]_D^{25}=+43°$ (c.=0.69). Infrared spectrum in potassium bromide: $\lambda_{max.}=1764, 1730, 1690$ cm.$^{-1}$.

When 2-oxo-1:5β-cyclo-20β-acetoxy-10α-pregnene is treated in identical manner, it yields Δ$^1$-2:5α:20β-triacetoxy-10α-pregnene. Infrared spectrum: $\lambda_{max.}=1765, 1730, 1690$ cm.$^{-1}$.

*Example 3*

A solution of 1.940 g. of Δ$^1$-2:5α:17β-triacetoxy-10α-androstene in 90 cc. of glacial acetic acid is mixed with 10 cc. of water and 70 drops of concentrated sulfuric acid. The solution is left to itself for 110 hours at room temperature, then poured into ½ liter of water and extracted with 2 liters of ether. The organic phase is washed with water, mixed with 200 cc. of benzene, and evaporated under vacuum. The residue is further acetylated overnight at room temperature in 50 cc. of a 1:1-mixture of acetic anhydride and pyridine. The solvent is then evaporated under vacuum, the residue filtered through neutral alumina (activity III) and the crude product is crystallized from acetone+hexane, to yield 1.426 g. of 2-oxo-5α:17β-diacetoxy-10α-androstane melting at 187–188° C. Optical rotation $[\alpha]_D^{25}=+40°$ (c.=0.50). Infrared spectrum in Nujol: $\lambda_{max.}=1733$ (shoulder), 1724, 1257, 1246 cm.$^{-1}$.

When 2.5 g. of Δ$^1$-2:5α:20β-triacetoxy-10α-pregnene are hydrolyzed under the conditions as described above, there are obtained 1.80 g. of pure 2-oxo-5α:20β-diacetoxy-10α-pregnane.

*Example 4*

(A) A solution of 200 mg. of Δ$^1$-2:5α:17β-triacetoxy-10α-androstene in 10 cc. of dioxane is mixed with 200 mg. of selenium dioxide and the whole is refluxed for 20 hours, then cooled, filtered, the residue is rinsed with benzene, and the filtrates are evaporated under vacuum. Chromatography of the crude product on neutral alumina (activity III) with a 4:1-mixture of petroleum ether and benzene furnishes 120 mg. of unreacted starting material, and elution with benzene yields 28 mg. of Δ$^4$-2ξ:17β-diacetoxy-3-oxo-10α-androstene which melts at 225° C. after four recrystallizations from acetone+hexane and sublimation in a high vacuum at 185° C. Optical rotation, $[\alpha]_D^{25}=-191°$ (c.=0.86). Ultraviolet spectrum: $\lambda_{max.}=244$ mμ (ε=15,400). Infrared spectrum in chloroform: $\lambda_{max.}=1725, 1735, 1682, 1625, 1255$ cm.$^{-1}$.

(B) 780 mg. of 2-oxo-5α:17β-diacetoxy-10α-androstane in 50 cc. of glacial acetic acid are stirred at room temperature under nitrogen with 1.020 g. of lead tetraacetate (containing about 10% of glacial acetic acid) and with 1.5 cc. of boron trifluoride etherate. After 1½ hours' reaction the batch is poured over ice, extracted with ether and the ethereal extract is washed with sodium bicarbonate solution and water. The resulting oil (850 mg.) is chromatographed on 50 times its own weight of neutral alumina (activity III). A 1:1-mixture of petroleum ether+benzene elutes 282 mg. of unreacted starting material. Thereafter the same solvent mixture and benzene elute 329 mg. of crystals which melt at 225° C. after recrystallization from acetone+hexane and sublimation in a high vacuum. According to the mixed melting point test, infrared and ultraviolet spectra this product is identical with the compound obtained under (A) above.

When 1.2 g. of 2-oxo-5α:20β-diacetoxy-10α-pregnane are treated in an identical manner and then chromatographically purified, there are obtained 385 mg. of Δ$^4$-2ξ:20β-diacetoxy-3-oxo-10α-pregnene.

*Example 5*

A solution of 185 mg. of Δ$^4$-2ξ:17β-diacetoxy-3-oxo-10α-androstene in 10 cc. of glacial acetic acid is mixed with 200 mg. of zinc dust and heated to the boil. In the course of 2 hours another 200 mg. of zinc dust are stirred in portionwise, and the mixture is cooled and evaporated to dryness under vacuum. Chromatography on neutral alumina (activity II) and elution with hexane+benzene (3:2) and with benzene furnishes 125 mg. of crystals which after two recrystallizations from methylene chloride+hexane and sublimation in a high vacuum at 140° C. furnish 10α-testosterone-17β-acetate melting at 145–146° C. Optical rotation, $[\alpha]_D^{25}=222°$ (c.=0.67). Ultraviolet spectrum: $\lambda_{max.}=245$ mμ

(ε=15,980)

Infrared spectrum in chloroform: $\lambda_{max.}=1720, 1660, 1625, 1255$ cm.$^{-1}$.

The subsequent hydrolysis of the above compounds with aqueous-methanolic potassium hydroxide solution under nitrogen for 16 hours at 25° C. furnishes in a substantially quantitative yield free 10α-testosterone which melts at 146° C. after recrystallization from ether+hexane followed by sublimation in a high vacuum. Optical rotation $[\alpha]_D^{25}=-208°$ (c.=0.73).

An analogous reduction and subsequent hydrolysis of 200 mg. of Δ$^4$-2ξ:20β-diacetoxy-3-oxo-10α-pregnene given rise to Δ$^4$-3-oxo-20β-hydroxy-10α-pregnene which, on oxidation with chromium trioxide in pyridine at 25° C. for 16 hours, furnishes 105 mg. of 10α-progesterone.

*Example 6*

130 mg. of 3-oxo-17β-acetoxy-1:5-cyclo-10α-androstane are mixed with 3 cc. of a solution of 0.1 g. of concentrated sulfuric acid in 10 cc. of glacial acetic acid and the mixture is heated for 2 hours to 95° C. The normally worked up reaction mixture is dissolved in benzene and filtered through 1 g. of neutral alumina (activity II). After recrystallization from acetone+hexane, the 111 mg. of Δ$^5$-2-oxo-17β-acetoxy-10α-androstene obtained melts at 181–182° C. Optical rotation $[\alpha]_D=-55°$ (c.=0.98). Infrared spectrum in chloroform: 1725, 1710, 1240 cm.$^{-1}$. Tetranitromethane test: yellow.

*Example 7*

200 mg. of O-acetyl-10α-testosterone (cf. Example 5) in 30 cc. of dioxane are boiled and stirred for 8 hours with 500 mg. of dichloro-dicyan-benzoquinone. When the solution has cooled, it is diluted with ether, filtered and evaporated. The crude product obtained is dissolved in methylene chloride, the solution filtered through the ten-fold quantity of alumina (activity III), the fractions obtained are evaporated under vacuum, the residues combined and dissolved in 20 cc. of methanol and the solution boiled for 10 minutes with active carbon. The reaction mixture is freed from the active carbon and then concentrated to obtain 100 mg. of O-acetyl-1-dehydro-10α-testosterone which after having been recrystallized twice from a mixture of acetone and petroleum ether have a constant melting point at 127° C. $[α]_D^{25}=-78°$. (c.=0.99). The IR spectrum of the compound shows bands, inter alia at 1725, 1664, 1625, 1607 and 1260 cm.$^{-1}$, $λ_{max.}=247$ mμ (ε=15,900).

45 mg. of the compound so obtained yield, when boiled for 1 hour in 10 cc. of 5% methanolic potassium hydroxide solution and worked up, 44 mg. of crystals. On filtration through neutral alumina (activity III) and two crystallizations from acetone+petroleum ether, the pure 1-dehydro-10α-testosterone of melting point 95–97° C. $[α]_D=-70°$ (c.=0.68) is obtained. The IR spectrum shows bands inter alia at 3620, 1660, 1620 and 1605 cc.$^{-1}$, $λ_{max.}=247$ mμ (ε=13,250).

By treating in an analogous manner 230 mg. of 10α-progesterone in 50 cc. of dioxane with 700 mg. of dichloro-dicyan-benzoquinone, 205 mg. of crude 1-dehydro-10α-progesterone are obtained. $λ_{max.}=247$ mμ (ε=12,800). The IR spectrum of the crude compound shows bands inter alia at 1704, 1663, 1625 and 1605 cm.$^{-1}$.

*Example 8*

A solution of 950 mg. of 10α-testosterone in 500 cc. of tertiary butanol is irradiated for 72 hours with a high pressure burner Q81 (made by Quarzlampen G.m.b.H., Hanau, Germany), at room temperature in a central water-cooled quartz jacket. The solvent is evaporated in vacuo and the oily residue chromatographed over 24 g. of neutral alumina (activity III). Eluation with benzene yields 197 mg. of crystalline Δ⁵-3-oxo-17β-hydroxy-10α-androstene. Melting point after two recrystallizations from acetone+petroleum ether: 173–174° C. $[α]_D=-119°$ C. (c.=0.66). IR spectrum (CHCl₃): $ν_{max.}=3640$, 1712, 1668 cm.$^{-1}$. UV spectrum (ethanol): $λ_{max.}=213$, 293 mμ (ε=2040, 170).

With mixtures of benzene and ether (9:1), 213 mg. of unchanged starting material are isolated.

What is claimed is:

1. A compound of the formula

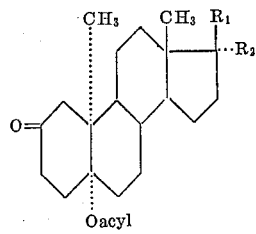

wherein R₁ is a member selected from the group consisting of hydroxy and acyloxy, said acyloxy being derived from a carboxylic acid having 1 to 15 carbon atoms, and R₂ is a member selected from the group consisting of hydrogen, lower alkyl, lower alkenyl and lower alkinyl, and R₁ and R₂, taken together, is oxo.

2. 2-oxo-5α,17β-diacetoxy-10α-androstane.

3. A compound of the formula

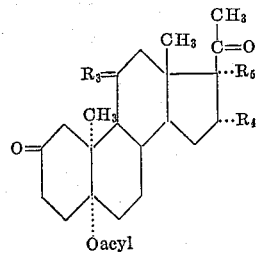

wherein R₃ is a member selected from the group consisting of two hydrogen atoms, the oxo group, α-hydroxy and hydrogen and β-hydroxy and hydrogen, R₄ is a member selected from the group consisting of hydrogen and methyl, and R₅ is a member selected from the group consisting of hydrogen, hydroxy and acyloxy, each of said acyloxy groups being derived from carboxylic acids having 1 to 15 carbon atoms.

4. 2-oxo-5α,20-diacetoxy-10α-pregnane.

5. Δ⁴-3-oxo-2ξ,20β-diacetoxy-10α-pregnene.

6. A compound of the formula

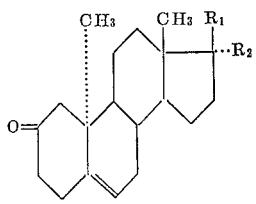

wherein R₁ is a member selected from the group consisting of hydroxy and acyloxy, said acyloxy being derived from a carboxylic acid having 1 to 15 carbon atoms, R₂ is a member selected from the group consisting of hydrogen, lower alkyl, lower alkenyl and lower alkinyl, and R₁ and R₂, taken together, is oxo.

7. Δ⁵-2-oxo-17β-acetoxy-10α-androstene.

8. Process for the manufacture of Δ⁴-3-oxo-10α-steroids, wherein a Δ³-2-oxo-1,5β-cyclo-10α-steroid selected from the group consisting of those of the androstane, pregnane, cholane, cholestane, spirostane and cardanolide series is hydrogenated with hydrogen catalytically activated with a noble metal catalyst, the 2-oxo-1,5β-cyclo-10α-steroid obtained is treated with a member selected from the group consisting of a strong acid selected from the group consisting of an anhydrous mineral acid, a lower aliphatic sulfonic acid, a monocyclic aromatic sulfonic acid and a Lewis acid; and mixtures of such acids with a member selected from the group consisting of an anhydride and a halide of a lower aliphatic carboxylic acid selected from the group consisting of an anhydride and a halide of a lower aliphatic carboxylic acid, the enol acylate obtained is treated with a member selected from the group consisting of selenious acid, a selenious acid ester, selenium dioxide and an aqueous acid, a resulting 2-oxo-10α-steroid is reacted with a lead tetraacylate and the Δ⁴-2-acyloxy-3-oxo-10α-steroid obtained is treated with zinc in a solvent.

9. Process according to claim 8, wherein a Δ⁴-3-oxo-10α-steroid is isomerized to a Δ⁵-3-oxo-10α-steroid by irradiation with ultraviolet light.

10. Process according to claim 8, wherein a Δ⁴-3-oxo-10α-steroid selected from the group consisting of those of the androstane, pregnane, cholane, cholestane, spirostane and cardanolide series is dehydrogenated in 1,2-position by reaction with a member selected from the group consisting of 2,3-dichloro-5,6-dicyano-benzoquinone and selenium dioxide.

References Cited by the Examiner

UNITED STATES PATENTS 3,001,989  9/1961  Ringold et al. _____ 260—239.55
3,198,792  10/1965  Reerink et al. _____ 260—239.55

FOREIGN PATENTS 929,271  6/1963  Great Britain.

OTHER REFERENCES

Fieser et al.: "Steroids" (1959), Reinhold Publishing Corp., pages 558, 559 and 572 relied on.

Schaub et al.: Chem. Ind. (London), 1961, pages 2003–4 relied on.

LEWIS GOTTS, *Primary Examiner.*

ELBERT L. ROBERTS, *Assistant Examiner.*